July 26, 1927.

J. F. GOLDING 1,636,955

PROCESS FOR MAKING NUT BLANKS

Filed Oct. 2, 1924   5 Sheets-Sheet 2

Inventor

John F. Golding

By H. N. Low

Attorney

July 26, 1927.
J. F. GOLDING
1,636,955
PROCESS FOR MAKING NUT BLANKS
Filed Oct. 2, 1924    5 Sheets-Sheet 3
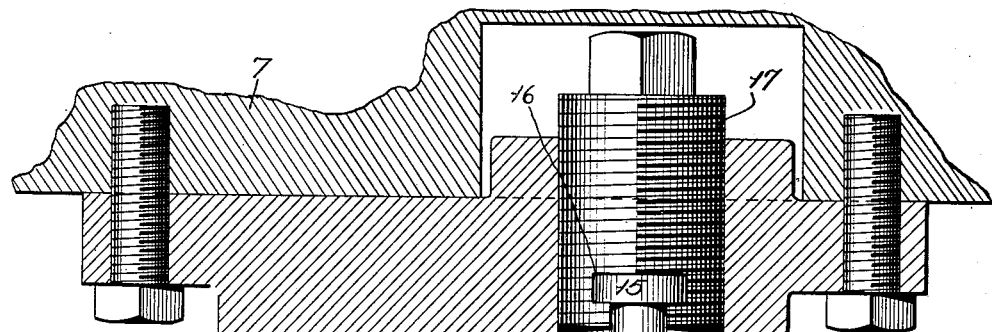
Fig. 4.
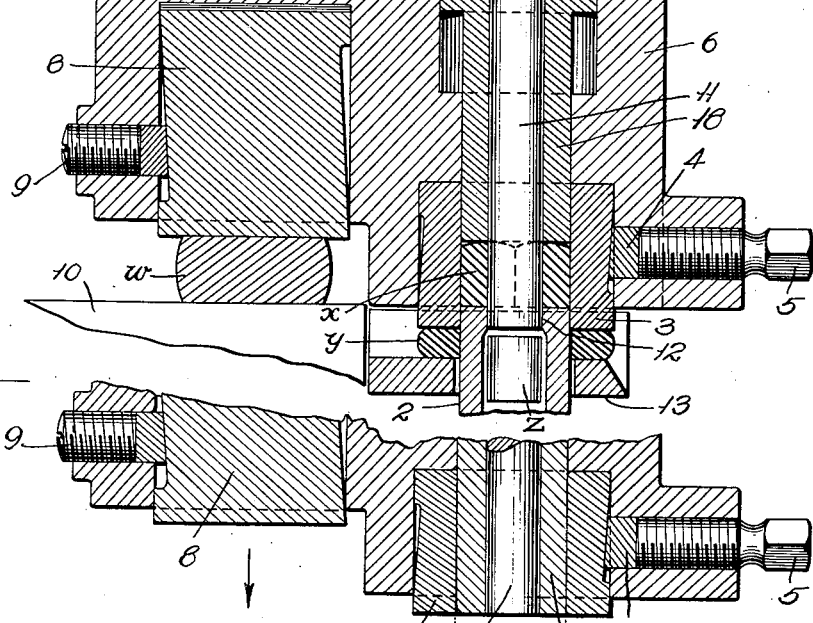
Fig. 5.
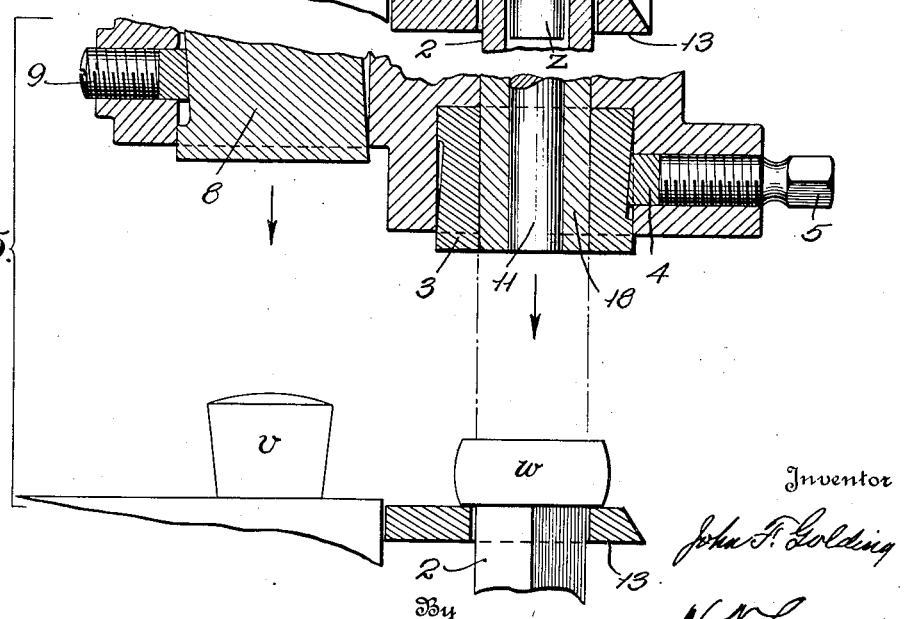
Inventor
John F. Golding
By N. W. Low
Attorney July 26, 1927.
J. F. GOLDING
1,636,955
PROCESS FOR MAKING NUT BLANKS
Filed Oct. 2, 1924    5 Sheets-Sheet 4
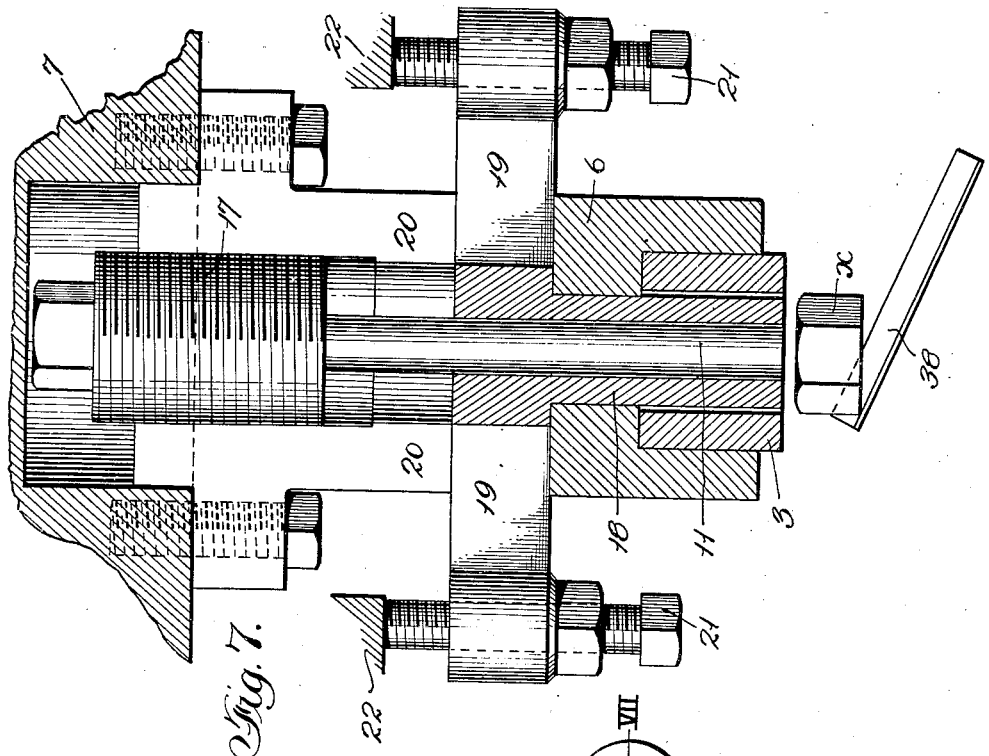
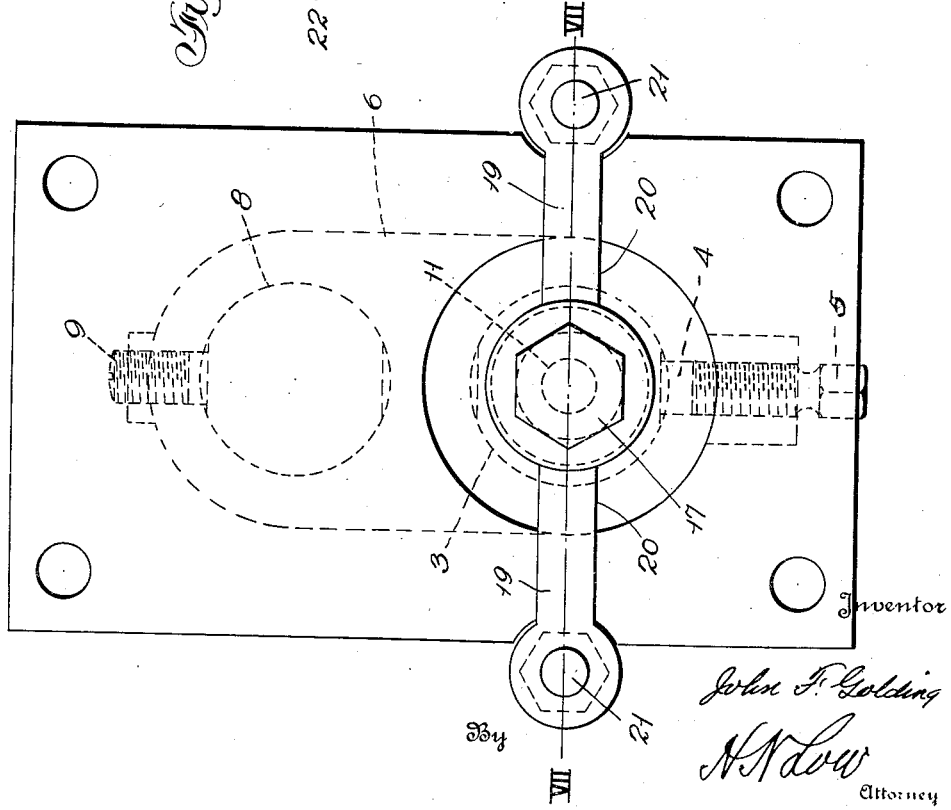
Inventor
John F. Golding
By N. N. Low
Attorney July 26, 1927.

J. F. GOLDING 1,636,955

PROCESS FOR MAKING NUT BLANKS

Filed Oct. 2, 1924

Inventor
John F. Golding
By N. N. Low
Attorney

Patented July 26, 1927.

1,636,955

UNITED STATES PATENT OFFICE.

JOHN F. GOLDING, OF PHILADELPHIA, PENNSYLVANIA.

PROCESS FOR MAKING NUT BLANKS.

Application filed October 2, 1924. Serial No. 741,267.

As to this process, it was disclosed and claimed in my application Serial No. 629,440, filed April 2, 1923, and was officially required to be divided therefrom, and in respect of said subject matter this application is a continuation in part of my said former application, and the process may be performed by the apparatus described in said former application, and I have set forth herein a somewhat modified apparatus also well adapted for the performance of the same process.

The invention relates to the manufacture of nut blanks, meaning nuts not threaded, from suitable metal usually sufficiently softened by heat. My method of process of manufacture does not depend upon special constitution of the steel or iron material upon which it is exercised, and is well adapted for the utilization of scrap metal, such as punched slugs, crop-ends of plates and the like, but does not exclude operation upon more expensive pre-shaped bars or plates. By slugs I intend metal punchings from plates, bars, nut blanks or the like, or sections of bolt rods, or other suitable forms of scrap metal.

It is the object of my invention to so complete the nut by a brief and simple operation that it is immediately merchantable as a substantially finished blank, and is usable as soon as it is threaded, the threading being preferably accompanied by removal of any existing fins from the bottom edges of the blank. The threading operation is facilitated by my process of making the nut blank and is rendered more easy and accurate than is the case when the blanks are formed in other known ways.

The two methods of manufacture of nut blanks now commonly used are the cold-cut process and the hot-pressed process. These are well known and each involves a number of successive stages of manufacture, and requires the use of preshaped bars of metal (usually of a special constitution), and results in an imperfect product, unless the same be expensively finished. Where well finished nuts were required additional expense of machining and finishing were involved.

My process, which eliminates steps of procedure and operations now considered necessary in the manufacture of nut blanks and which are more or less tedious and expensive, comprises broadly the preheating of the subject metal to a suitable degree, such as a cherry, orange or light orange heat (1200° to 1500° F. is practicable) and the cutting, shaping and punching thereof to the form of a nut blank which does or may have all of the configuration of a finished nut excepting the threading of the bolt hole. This shaping is performed in a very rapid, economical and perfect manner, as is hereinafter explained in detail, and is concerned with the finishing of the sides, bottom, crown and hole of the nut blank so that the same is complete and merchantable as a nut after the threading operation, though in some cases slight fins may remain to be removed in connection with the threading operation.

An incidental step in my procedure is the removal of depending fins, if there be such, from the bottom edge of the punchings, such fins being obstacles to the accurate sliding and feeding of the punchings to the cutting dies. This removal of fins may be performed in a suitable manner, as by flattening the bottoms of the slugs which obliterates the fins as obstacles to feeding. This step of flattening may also extend to reducing the slugs to about the thickness of the nut blanks to be produced, but if slugs are being treated which are of approximately the said thickness such preliminary flattening and reduction is not necessary but may be performed to closely regulate the thickness of the finished blank. Punchings ordinarily have domed tops and if they are not flattened such tops will promote the crowning of the nut blanks by the cutting operation alone without other endwise pressure. But even if their tops be flattened the cutting pressure alone will cause the tops of the blanks at and near the lines of cutting to curve over and downward, producing an efficient crown.

With such objects in view, as well as other advantages which may be incident to the use of the improvements, the invention consists of the steps and combinations thereof and procedure hereinafter set forth and claimed, with the understanding that the several necessary elements constituting the same may be varied without departing from the nature and scope of the invention.

In order to make the invention more clearly understood there are shown in the accompanying drawings means for carrying the process into practical effect, without limiting the same in its useful applications, to the particular constructions which, for the purpose of explanation, have been made the subject of illustration.

In said drawings:—

Fig. 4 is a vertical longitudinal section on a larger scale of the flattening and cutting parts of said press at the moment of finishing a slug-flattening and blank-cutting operation.

Fig. 5 is a similar view showing the same parts at the top of their stroke prior to the operation shown in Figure 4.

Fig. 6 is a plan view of the lower part of the press.

Fig. 7 is a vertical section of the same on line VII—VII of Fig. 6, with the press plunger elevated and the nut blank being discharged.

Figs. 10, 11 and 12 are detail views, shown partly in section, illustrating the pressing of the slug and cutting of the nut blank at a single station, these views showing successive steps of this operation.

Fig. 13 is a similar view showing the bottoms of the female punch and block flat for the purpose of flattening and reducing or flattening without reducing, slugs which may be distorted, and leaving the slugs with flat tops.

Figure 1:
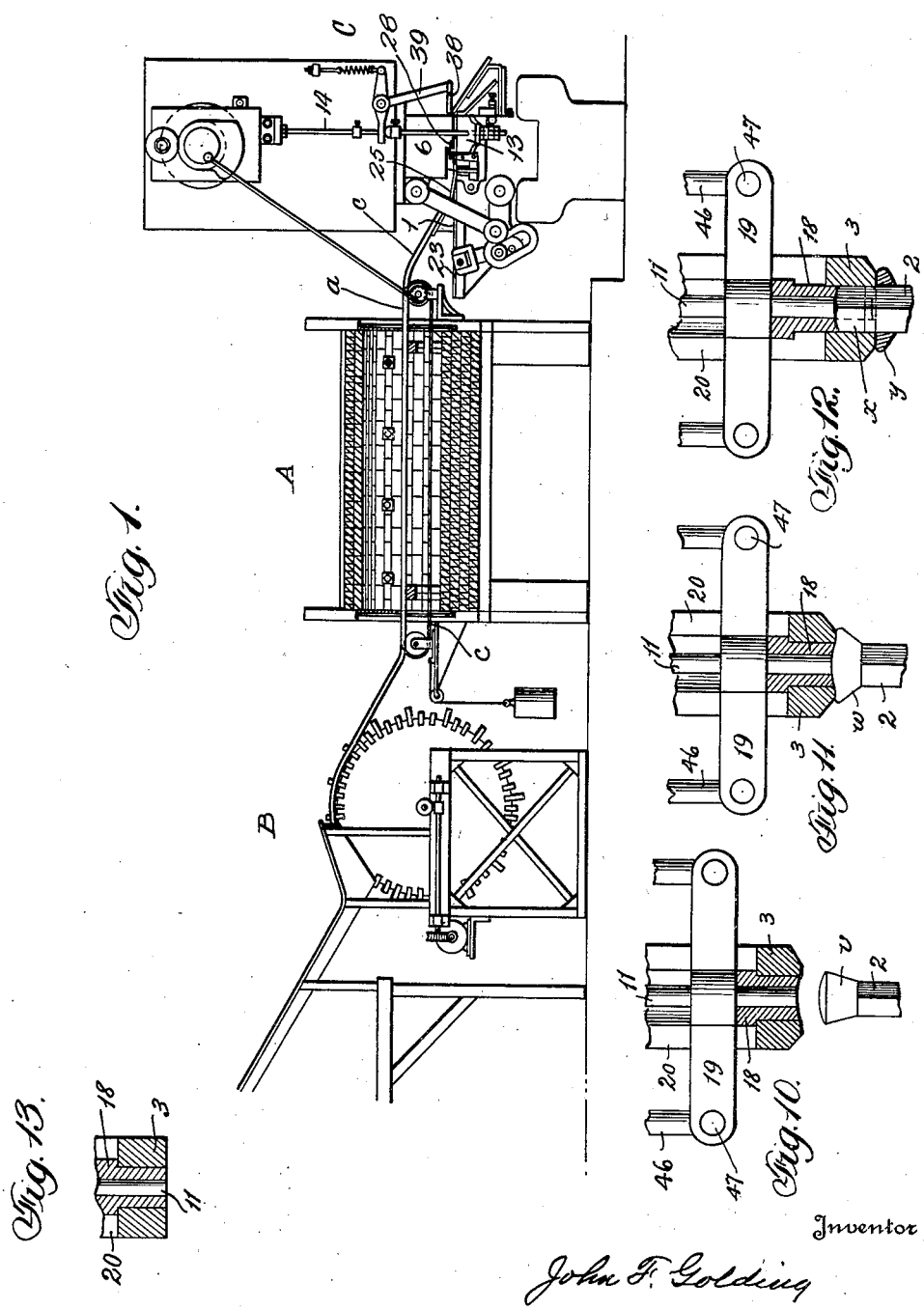
Fig. 1 is a side view of an apparatus suitable for performing my process, comprising a slug feeder and heating and softening furnace similar to that set forth in my said application; and comprising a press in which both the slug-flattening and the cutting operations can be simultaneously performed.

Referring to the drawings, the heating and softening of the iron or steel is performed in a suitable furnace or heater of known or suitable character, from which the heated metal is transferred by hand or by automatic means to the dies which cut and shape the nut blanks. In my said application, of which this present application is a continuation in part, I have set forth in detail a furnace and automatic conveying means suitable for the heating of punchings or slugs and the delivery thereof to the cutting dies while in a condition sufficiently heated for the performance of my process; and my invention herein claimed contemplates the utilization, for the performance of my process, of the said or any other suitable known or improved apparatus, for instance the improved flattening and cutting means herein set forth.

Referring to the drawings in detail, A indicates the slug-heating and softening furnace to which the slugs are supplied in any desired manner, as by an automatic slug-selecting and delivering machine B. The chain conveyer $a$ of the furnace delivers heated slugs successively to a chute $c$ down which they slide by gravity to the bed 1 of the press C. The conveyer is constructed of nichrome heat-resisting links.

2 is the male die which is preferably fixed firmly but removably in the lower part of the press as a lower die. 3 is the female and upper die fixed by a set-block 4 and set screw 5 in the die holder 6, the latter being vertically movable with the cross-head 7 of the press. The holder 6 also carries a hammer 8 secured therein by a set screw 9, and the hammer cooperates with an anvil part 10 of the bed of the press to flatten the heated slug $v$ to the form shown at $w$ (Fig. 4). On the descent of the holder 6 the hammer performs its flattening operation on the heated slug which has been positioned beneath it and at the same time the die 3 cooperates to cut the blank $x$ from a flattened slug $w$ (Fig. 4) which has been positioned and centered between the dies, as seen in Fig. 5, and form the blank with smooth vertical sides.

Figure 2:
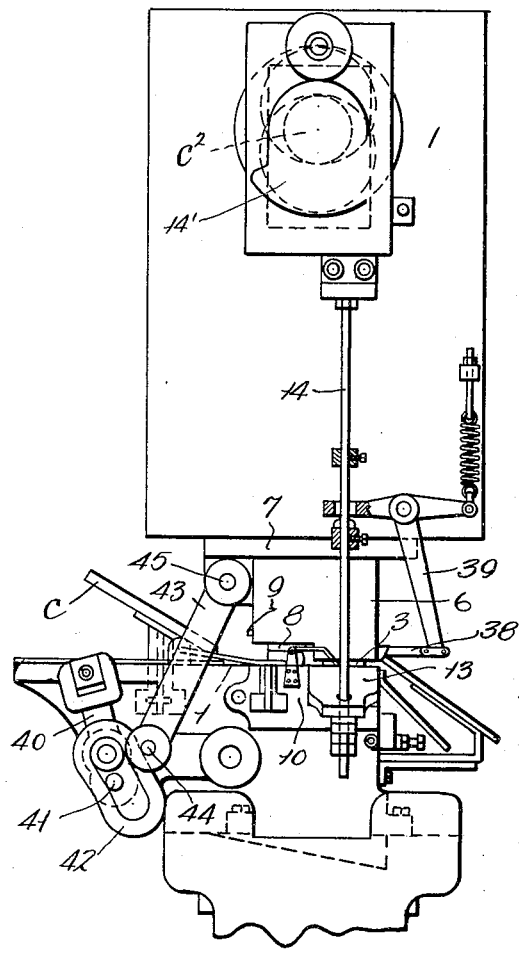
Fig. 2 is a side view of the principal part of said press on a larger scale.
Figure 3:
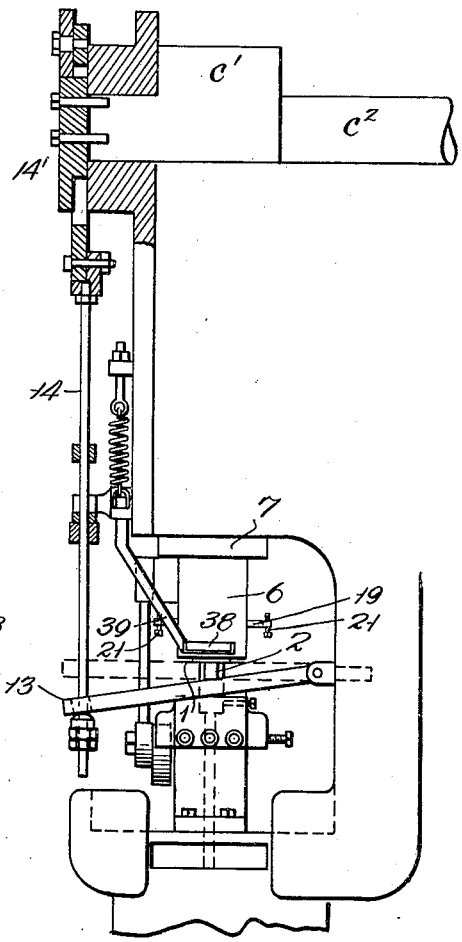
Fig. 3 is an end view, partly in section, of the delivering end of said press.

At the same time the hole cutter or piercer 11 cooperates with the perforation 12 of the die 2 to very smoothly cut and perforate the nut blank (Fig. 4), removing therefrom a small core slug Z which drops or is forced down through said perforation 12. The cutting operation of the dies 2 and 3 forms and removes from the blank $x$ a ring-like scrap $y$ the same being the outer rim of the slug which has thus been cut. This scrap $y$ as it is made forces down a plate 13 (Fig. 4, or this plate is mechanically lowered at this instant), and when the die 3 rises the plate 13 is lifted by a rod 14 and suitable cam action 14' at the top of the press (Figs. 2 and 3) and strips the scrap $y$ up from around the die 2, and before the next flattened slug is centered between the dies the scrap $y$ is removed or swept away by suitable means.

The piercer 11 moves with the holder 6 and die 3, having a head 15 fitted in slots 16 in an adjusting screw 17, the latter being screwed into the holder 6. By the screw 17 the piercer may be adjusted relative to the bottom of the die 3 to be flush therewith or to project a little below the same as may be desired.

Around the piercer is arranged the blank-ejector 18 so as to be vertically slidable in the holder 6 and die 3. The ejector is loose and as the nut blank is cut the ejector is lifted by the blank (Fig. 4) but it imposes no pressure endwise or down on the blank excepting the mere weight of the ejector, and the latter has no function to crown the blank. The ejector has yoke arms 19 extending out through slots 20 in the holder and these arms are provided with adjustable stop screws 21. When the holder 6 is lifted (Fig. 7) the screws 21 encounter fixed parts 22 of the press frame and the ejector is arrested and the finished nut blank is stripped from off the piercer and from within the die 3. The blank not being pressed on its top by any usual forming and crowning plunger is free to expand or swell upward in the die 3, and the thickness of the finished blank depends upon the thickness of the metal which is placed on the lower die and is changed a little in thickness by the die-cutting action; and the thickness of the metal operated on depends upon the selection of a desired thickness or upon the action of the hammer 8.

Figure 8:
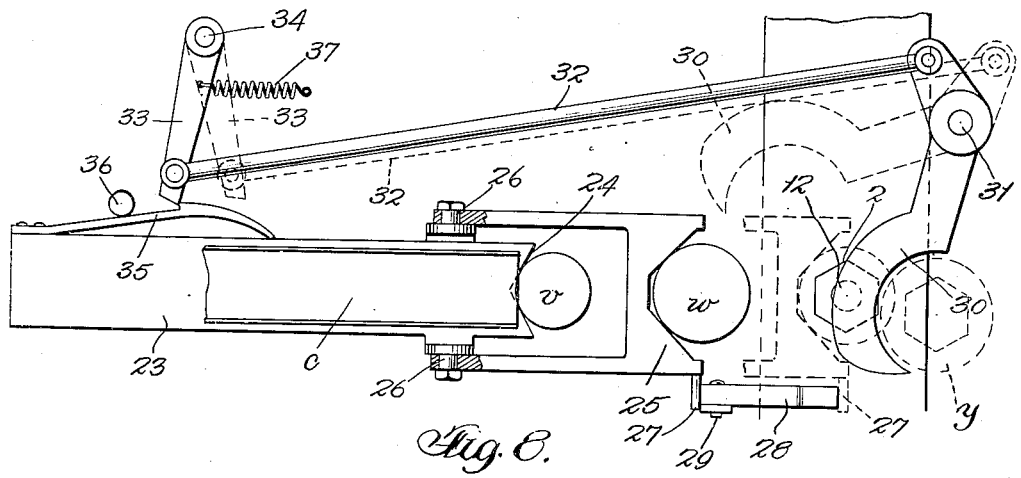
Fig. 8 is a side view illustrating the means for advancing the slug to be flattened, and ahead of it the finished slug, to their respective positions beneath the hammer and between the cutting dies.
Figure 9:
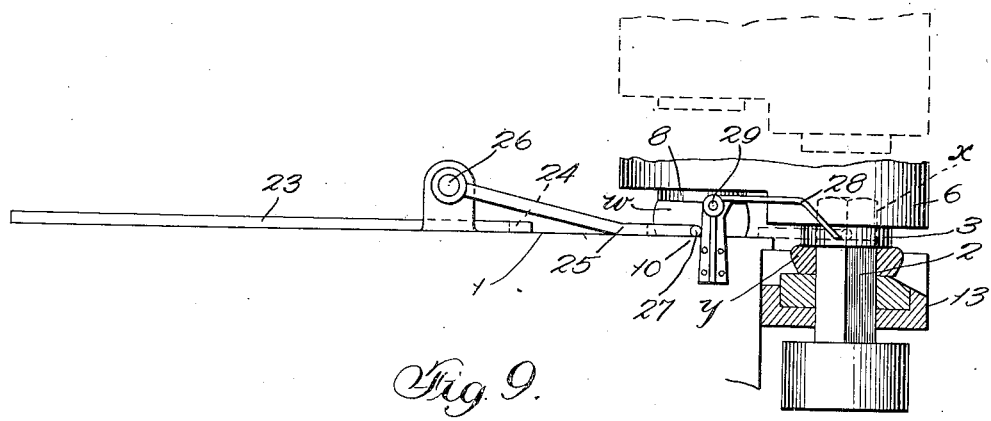
Fig. 9 is a side view of the same.

In order to make clear that part of my process which relates to the feeding, for flattening and cutting, of the heated slugs I have shown a suitable means for the purpose in Figs. 8 and 9. 23 is a feed slide reciprocating horizontally in the bed or frame of the press at about the level of the flattening and cutting stations. This slide has pushing and centering jaws 24 in front of which, when the slide is retracted, is received a heated slug $v$ from the chute $c$, and when the slide moves towards the hammer and dies said slug is pushed and left centered beneath the hammer as the slide is retracted. The flattened slug is advanced from the flattening to the cutting station by other pushing and centering jaws 25 pivoted at 26 to the slide 23. When the slide is retracted the jaws 25 are lifted and pass back over a slug positioned for flattening without disturbing it, by means of a pin 27 fixed on the jaws 25 and adapted to slide rearward on a switch or cam plate 28 which lifts the parts 27 and 25. This plate is pivoted at 29 to the frame of the press so that when the pin 27 moves forward it passes under the plate 28 by lifting it and then dropping it into its operative position.

The scrap $y$, having been lifted by the stripper plate 13 clear of the die 2 is removed to one side away from the cutting station by a brush 30 or the like which I have shown in the form of an arm pivoted to the press frame at 31 so that it can sweep across the cutting station (Fig. 8). A link 32 connects this brush with a lever 33 pivoted at 34 to the press frame. When the slide is retracted it draws the lever 33 away from the operating stations and causes the brush to sweep across the die 2 from the position shown in full dotted lines to the position shown in full lines, by means of a hooked spring 35. Near the end of the retraction of the slide a fixed pin 36 causes the spring 35 to release the lever 33 whereupon a spring 37 restores the brush to the position shown in dotted lines.

The cross-head 7 is reciprocated vertically by a cam $c'$ on the shaft $c^2$ in a known manner. The slide 23 is suitably reciprocated horizontally by a suitable means, as by those shown in Fig. 2. 40 is a lever the upper end of which is connected with the slide. This lever is pivoted to the press frame at 41 and has a roller which is moved to the right or left (in said Fig. 2) by a vertically swinging slotted lever 42. This lever is swung up and down in proper time, relative to the movement of the upper die, by a link 43 pivoted to the lever and cross-head at 44 and 45.

It will be understood that after the slide 23 has been adjusted for the feeding of slugs of about a certain diameter and not varying too much therefrom it will continue to be operated on slugs of such sizes. The slugs may vary a little in diameter but the result will be accomplished if the dies cut within or out to the perimeter of the slug. If it be desired to cut slugs of a materially different diameter the slide 23 is or may be adjusted relative to the power element which moves so that the slug will be sufficiently centered by the slide between the dies. Or the length of forward stroke of the slide may be changed. It will be understood that the exterior of the nut blanks may be cut square or hex or of other suitable shape, and the shape of the dies may be chosen accordingly.

The slugs need not be selected and fed automatically to the furnace but may be placed by hand on the furnace conveyer before it enters the furnace to carry the slugs thereinto.

The outside scrap $y$ may be pushed away by the succeeding slug as the latter is centered between the dies, or by an advance pusher pivoted like the pusher 25. But I prefer a sweeper like the part 30 which will remove the exterior scrap even if it be cut into a plurality of pieces.

For utilizing other features of my invention the cutting of the nut faces and the piercing need not be simultaneous, but such simultaneous cutting exteriorly and interiorly makes a truer and better nut blank with the perforation concentric with the periphery and parallel with the side faces, and improves the finish, and enables two cuttings to be made at the same heat.

Important features of my invention can be utilized in operating upon punched or other slugs, as on crop ends of plates and other waste material, or any suitable material. Those slugs of about the thickness of the nut blanks to be produced may be placed on the conveyer $c$ and passed along the same, without firing of the furnace, and operated upon by the flattening and cutting means as already described. Also distorted slugs of not too great thickness may be flattened and trued and then cut without any substantial reduction in thickness of the metal, and this last observation applies to all suitable metal which is of about the thickness of the desired nut blanks.

In my said former application I have shown die means by which the slug or other metal may first be shaped on its top and reduced in thickness as may be desired and thereafter, by the same die means, and by a further movement of the same, act to produce the finished nut blank. In Figs. 10, 11 and 12 I have shown such die apparatus, the central element or ejector of which is operated by power from the main shaft and cams thereon through the medium of rods 46 which connect with the cross-arms 19 by pivots 47. When the cross-head 7 first descends the die 3 and ejector 18 move together, and both of these parts may be shaped concavely to preserve or form the domed top of the slug, as seen in these figures. At the instant when the slug has been sufficiently reduced in thickness the cams operating the part 18 will cease to depress it, whereas the downward movement of the die 3 continues and cuts the faces of the nut as already described. On the upward movement the die 3 is restored to its initial position relative to the ejector and the nut is discharged from within the female die substantially as already described and shown in Fig. 7. In this construction the ejector 18 also performs a pressing and reducing operation. In Fig. 10 the parts are shown in position when they are about to descend and reduce the slug. Fig. 11 shows the instant at which the slug is sufficiently reduced, and Fig. 12 shows the position when the die 3 has descended further relative to the ejector 18 and has cut the faces of the nut and removed the exterior scrap y therefrom, the part 18 having moved upward for the thickness of the nut blank.

In Fig. 13 is shown a construction in which the same parts, operated in the same manner, are adapted for the reduction of the slug without giving anything but a flat shape to its top. In the operations here described the piercer 11 acts in the same manner as already set forth, as does also the lower male die 2.

When metal is to be operated on without preliminary flattening the hammer may readily be removed from the press, and if the slugs are being cut into nut blanks they will be properly advanced by the feeding elements which have been described.

The hammer and the die 3 are made reversible for increased durability, and are formed with inclined surfaces as shown, against which the set screws or other set-blocks may bear to obtain strong grips in order to hold the hammer and die securely in place.

When the finished nut blank is ejected, as seen in Fig. 5 it is received by a movable chute or deflector plate 38 which is swung into position for the purpose by the rod 39 as soon as the cross-head has risen high enough to permit. As the cross-head begins to descend on the next stroke this chute is swung back out of the way.

The lower end of the chute c is provided with feed control means of known character, or such as shown in my said application, whereby the heated slugs are delivered separately one by one in front of the pusher device 24, such delivery being timed properly with the movements of the other parts of the press.

I will now mention useful features and results of my invention: The side faces of the nut-blank are cut true, smooth and perfect and at right angles to the bottom and need no further trimming or finishing; the same is true of the bolt-hole of the blank which is left smooth and usually has even a polished appearance, which is a perfect preparation for easy and accurate threading without any preliminary reaming operation; the bottom of the blank is made flat and true by the pressure exerted around the margin of the blank in the operation of cutting the side faces, aided by the pressure exerted in cutting the bolt hole, so that no other endwise pressure on the blank is necessary for such shaping of the bottom; the nut is crowned smoothly around its perimeter and around the bolt hole, and perfectly finished in this respect by said cutting pressure around the outer margin, which depresses the soft metal just next to the straight lines of cutting at the sides, so that no other end pressure on the blank is necessary for the crowning and finishing of the blank, and it is not required that the inner end wall of the female die press on or make contact with the crown of the nut blank to shape the same; the usual separate operations of finishing the side faces and the bottom of the nut blank and of chamfering and crowning the same are or may be entirely done away with; there is no necessity for endwise pressure to cause the nut blank to be expanded sidewise into the angles of the die to fill the same, and consequently the performing of my process requires less than the ordinary strength of machinery and expenditure of power; the quality of the metal of the nut blank is improved by the heating and working of the same; and the above useful results are accomplished by one stroke of the press so that the process is rapid and economical.

As to the mechanism herein disclosed, I do not claim it herein as I understand that it would be considered divisible from the process and subject for another application for patent.

What I claim is:—

1. A process of making nut blanks from metal, which consists in heating the metal to make it sufficiently soft to be cut smoothly, and then cutting the metal along all the vertical sides of the nut blank to be produced and removing the exterior trimming to form the desired smooth faces of the blank and also, during the restrainment of the metal from outward flow by the side cutting means, cutting the metal from the middle of the blank to form a smooth perforation.

2. A process of making nut blanks from punched slugs or other suitable metal, which consists in heating the metal to make it sufficiently soft to be cut smoothly, and then cutting the metal along all of the vertical sides of the nut blank to be produced and removing the exterior trimming to form smooth faces on the blank and also, during the restrainment of the metal from outward flow by the side cutting means, cutting the metal from the middle of the blank to form a smooth perforation, and by the pressure of such cutting flattening the bottom the blank and forming a rounded crown on the top of the blank.

3. A process of making nut blanks from punched slugs or other suitable metal, which consists in heating the metal to make it sufficiently soft to cut smoothly, then flattening the soft metal to the thickness which will produce the desired blank, then cutting the metal along all the vertical sides of the nut blank to be produced and removing the exterior trimming to form smooth faces on the blank and also, during the restrainment of the metal from outward flow by the side cutting means, cutting the middle of the blank to form a smooth perforation.

4. A process of making nut blanks from punched slugs or other suitable metal, which consists in heating the metal to make it sufficiently soft to cut smoothly, then flattening the soft metal to the thickness which will produce the desired blank, then cutting the metal along all the vertical sides of the nut blank to be produced and removing the exterior trimming to form the desired smooth faces of the blank and also, during the restrainment of the metal from outward flow by the side cutting means, cutting the metal from the middle of the blank to form a smooth perforation, and by the pressure of such cutting flattening the bottom of the blank and forming a rounded crown thereon.

5. A process of making nut blanks from punched slugs, or other suitable metal, which consists in heating pieces of the metal to make them sufficiently soft to be cut smoothly, feeding said pieces individually and successively while so heated on to a die-cutting means, and then cutting the metal of each of said pieces along all the vertical sides of the nut blank to be produced and removing the exterior trimming to form the desired smooth faces of the blank and also, during the restrainment of the metal from outward flow by the side cutting means, cutting the metal from the middle of the blank to form a smooth perforation.

6. A process of making nut blanks from punched slugs or other suitable metal, which consists in heating the metal to make it sufficiently soft to be cut smoothly and then cutting the metal along all the vertical sides of the nut blank to be produced and removing the exterior trimming to form smooth faces on the blank and also, during the restrainment of the metal from outward flow by the side cutting means, cutting the metal from the middle of the blank to form a smooth perforation, and reducing the blank to the desired thickness only by the cutting pressures.

7. A process of making nut blanks from punched slugs or other suitable metal, which consists in heating the metal to make it sufficiently soft to be cut smoothly, and then cutting the metal along all the vertical sides of the nut blank to be produced and removing the exterior trimming to form smooth faces on the blank, and also, during the restrainment of the metal from outward flow by the side cutting means, cutting the metal from the middle of the blank to form a smooth perforation, and forming the said nut blank without pressure on the top or crown of the nut excepting such as is caused by the said cutting actions.

In testimony whereof I affix my signature.

JOHN F. GOLDING.